Aug. 8, 1933.   F. FERTSCH ET AL   1,921,971
CONTACT GLASS
Filed June 6, 1931
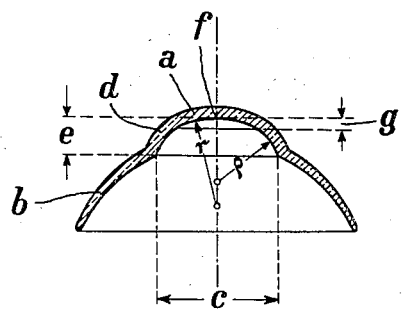
Inventors:
Ferdinand Fertsch
Hans Hartinger

UNITED STATES PATENT OFFICE 1,921,971

CONTACT GLASS

Ferdinand Fertsch and Hans Hartinger, Jena, Germany, assignors to the Firm Carl Zeiss, Jena, Germany Application June 6, 1931, Serial No. 542,553, and in Germany June 16, 1930

3 Claims. (Cl. 88—54)

We have filed an application in Germany, June 16, 1930.

When using contact glasses for correcting ametropic eyes the correction effect is produced by a lens of lachrymal secretion filling the space between the surface of the cornea of the eye and the interior surface of the corneal part of the contact glass. If the eye to be corrected is for instance highly myopic, the said interior surface must have a comparatively weak curvature which, eventually, may be even weaker than that of the sclerotic part of the glass. However, the cornea always protruding from the eyeball to a certain extent, a contact glass of the said kind would touch the eye only with its corneal and not with its sclerotic part as is necessary to ensure good fitting. Contrary thereto, there may be cases in which a too strong curvature of the corneal part, the diameter of which is inferior to that of the cornea, seems to make the use of a contact glass impossible.

The invention aims at avoiding the said disadvantage and adds to the bowl-like corneal part and the annular sclerotic part of the glass another, intermediate, annular part interconnecting the two first said parts in such a manner that the distance of the interior vertex of the corneal part from the smallest diameter of the sclerotic part is greater than the depth of the corneal part. Using such an intermediate part therefore offers the advantage that the corneal part is, so to speak, lifted relatively to the sclerotic part in the sense of the protrusion of the cornea in such a manner that any possible curvature of the corneal part will allow the sclerotic part of the glass to lie against the eyeball without the glass pressing against the cornea.

The interior meridional curve of the intermediate part which contributes to the formation of the fluid lens, may be any line, e. g. a straight one. This curve will however suit the form of the eye in a better way when representing the arc of a circle, in which case the interior surface of the annular intermediate part is a toric surface. By reason of easier manufacture it will be generally preferred to give the said surface a spherical form.

The accompanying drawing shows on an enlarged scale and in a central section the constructional example of a contact glass according to the invention.

The contact glass has a bowl-like corneal part $a$ with a comparatively great interior radius $r$ and an annular sclerotic part $b$ with a smallest interior diameter $c$. Both parts, $a$ and $b$, are interconnected by means of an intermediate part $d$ which represents an annular spherical zone of an interior radius $\rho$ so that the distance $e$ of the interior vertex $f$ of the corneal part $a$ from the smallest diameter $c$ of the sclerotic part $b$ is greater than the depth $g$ of the corneal part $a$.

We claim:

1. A contact glass comprising a bowl-like corneal part, an annular sclerotic part, and an annular intermediate part interconnecting the two first said parts, the distance of the interior vertex of the corneal part from the smallest diameter of the sclerotic part being greater than the depth of the corneal part.

2. In a contact glass according to claim 1 the interior meridional curve of the intermediate part being the arc of a circle.

3. In a contact glass according to claim 1 the interior surface of the intermediate part being a spherical surface.

FERDINAND FERTSCH.
HANS HARTINGER.